United States Patent [19]
Jackson

[11] 3,801,113
[45] Apr. 2, 1974

[54] ROTARY SHAFT SEAL
[75] Inventor: Daniel B. Jackson, Lexington, Ky.
[73] Assignee: Parker-Hannifin Corporation, Cleveland, Ohio
[22] Filed: Nov. 18, 1971
[21] Appl. No.: 199,925

[52] U.S. Cl. .............................................. 277/134
[51] Int. Cl. ............................................. F16j 15/32
[58] Field of Search ..................................... 277/134

[56] References Cited
UNITED STATES PATENTS
| | | | |
|---|---|---|---|
| 3,633,927 | 1/1972 | Van Deven | 277/134 |
| 3,501,155 | 3/1970 | Dega et al. | 277/134 X |
| 3,504,920 | 4/1970 | Halliday | 277/134 |

FOREIGN PATENTS OR APPLICATIONS
| | | | |
|---|---|---|---|
| 225,796 | 3/1969 | Sweden | 277/134 |

Primary Examiner—Samuel B. Rothberg
Attorney, Agent, or Firm—Donnelly, Maky, Renner & Otto

[57] ABSTRACT

A shaft seal having converging frusto-conical faces defining an annular sealing edge for contacting a rotatable shaft and thereby preventing leakage of oil from the oil side of the sealing edge to the atmospheric side of the sealing edge, the frusto-conical face on the atmospheric side of the sealing edge being formed with oblique pumping ribs having helical crests lying on a cylinder of substantially the same diameter as the sealing edge, said pumping ribs being operative to sweep oil leakage past the sealing edge back to the oil side. Preferably the pumping ribs are miniscule in size so that they will wear away and disappear during a fraction of the useful life of the seal when the sealing edge has worn itself to a leak-proof fit on the shaft to thus eliminate, at a predetermined wear-in point, the pumping action of such ribs so that dirt and dust is not carried from the atmospheric side to the oil side.

2 Claims, 6 Drawing Figures

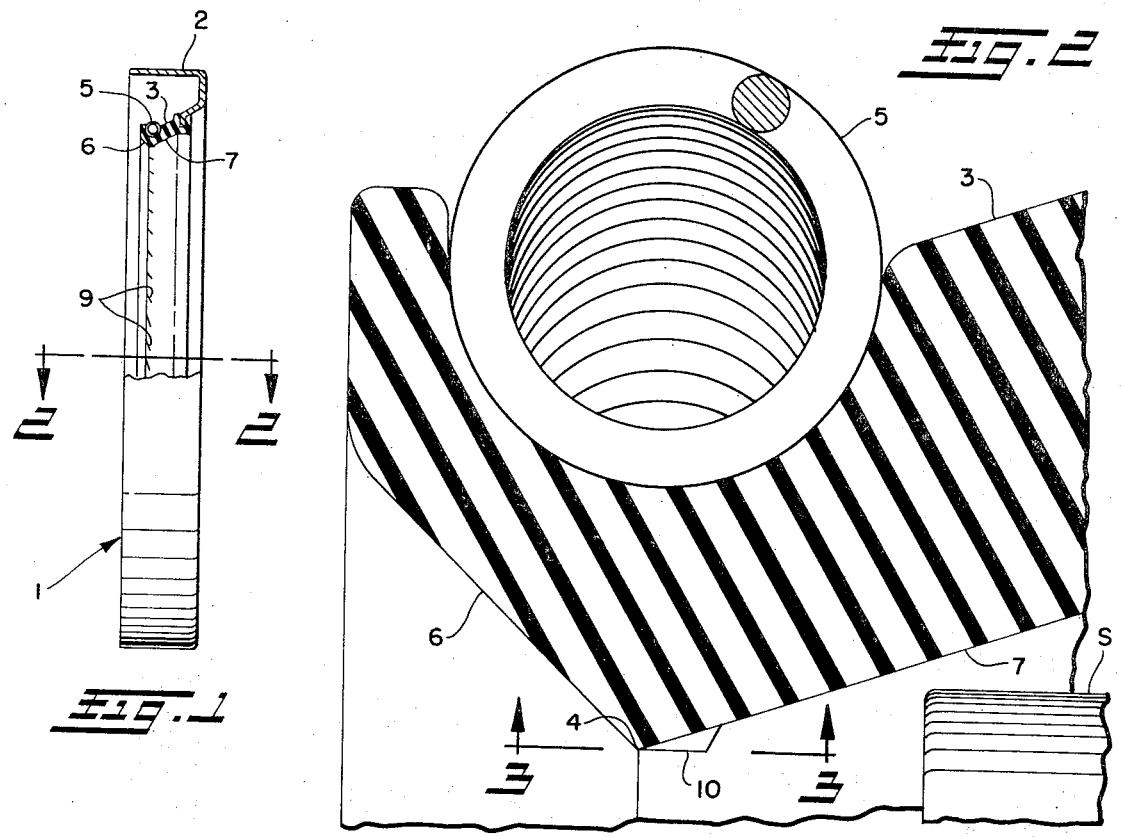
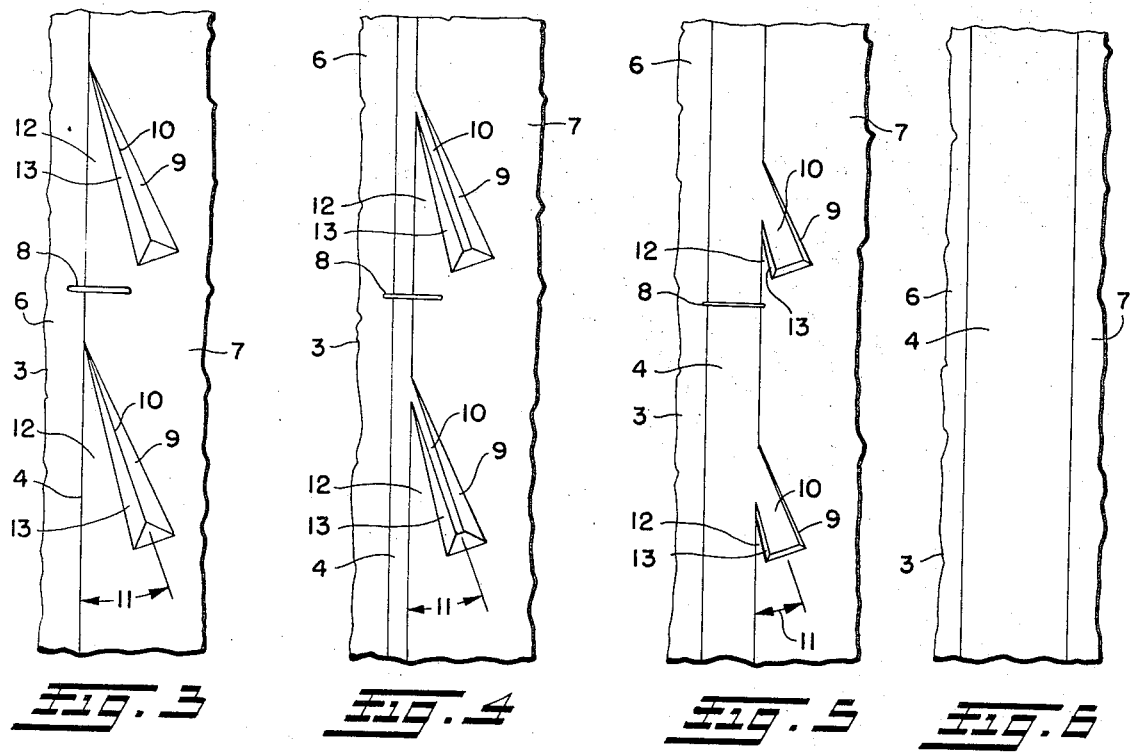

ROTARY SHAFT SEAL

BACKGROUND OF THE INVENTION

As known, when rotary shaft seals are molded of elastomeric materials it is very difficult to mold a sharp annular sealing edge sufficiently flawless so that it will make perfect sealing engagement around the shaft and therefore pumping elements have been provided on the air side of the sealing edge to pump leakage oil back to the oil side as the shaft rotates. If dust or dirt is present on the atmospheric side, small particles of the same may contact and become entrained in the leakage oil and be carried thereby to the oil side by the pumping action. As the shaft rotates, the imperfections in the sealing edge gradually wear off and the edge soon makes leak-proof contact around the shaft and when this occurs the pumping action is no longer required. However, in known rotary shaft seals employing such pumping elements the pumping action continues throughout the entire life of the seal.

When the sealing edge has worn into leak-proof contact with the shaft it will be in the form of a narrow band. Even though leakage as such has stopped there will nevertheless be a very thin film of oil between the shaft and the sealing edge and the pumping elements as well as on the shaft circumferentially between the pumping elements. In known arrangements, dirt particles on the atmospheric side contact this oil film and the pumping elements will cause the dirt to be pumped to the oil side which of course can be detrimental to moving parts being lubricated by the oil.

SUMMARY OF THE INVENTION

In the rotary shaft seal of the present invention the pumping elements are in the form of oblique ribs which are miniscule in both axial and radial dimensions so that they will perform their pumping function only as long as needed, that is, until minute imperfections of the molded sealing edge are worn away and the edge is in leak-proof engagement with the shaft. The pumping ribs have crests which are helical and which lie on a cylinder substantially equal to the diameter of the annular sealing edge.

BRIEF DESCRIPTION OF THE DRAWING

FIG. 1 is a side elevation view partly in cross-section of an oil seal embodying the present invention;

FIG. 2 is a much enlarged fragmentary radial cross-section view taken substantially along line 2—2, FIG. 1 at the junction of the crest of a pumping element with the sealing edge;

FIG. 3 is a view taken substantially along the line 3—3, FIG. 2 showing a plurality of pumping ribs and an imperfection in the sealing edge; and FIGS. 4, 5 and 6 are views similar to FIG. 3 except showing how the sealing edge and pumping elements contact the shaft initially when the seal is placed around the shaft (FIG. 4), after the seal has partly worn-in with the sealing edge and crests of the pumping ribs widened (FIG. 5), and after the seal has worn-in with imperfections having disappeared and with the pumping ribs having been completely worn away (FIG. 6).

DETAILED DESCRIPTION OF THE INVENTION

The shaft seal 1 herein comprises a metal case 2 having bonded thereto an elastomeric sealing element 3 providing an annular sealing edge 4 which is spring-loaded as by means of a garter spring 5 to make sealing contact with a rotating shaft S. The edge 4 is the line of convergence of frusto-conical faces 6 and 7 and is generally molded as sharp as possible although for practical reasons it may be initially rounded with a small radius of say, 0.002 to 0.005 inches or if desired, the sealing edge may be in the form of a narrow flat. In any of these cases it is difficult to mold the sealing edge so that it is completely without flaws or minute imperfections therein incident to the molding operation, such as a tiny slot 8 as illustrated in FIGS. 3, 4, and 5. Accordingly, such imperfection may permit leakage of oil from the oil side 6 to the atmospheric side 7 of said sealing edge 4 when the shaft seal 1 is assembled on a shaft S. Accordingly, the frusto-conical face 7 on the atmospheric side of the edge 4 is provided with a series of circumferentially spaced miniscule pumping ribs 9 of generally triangular cross-section as shown, each of which has a crest 10 which is on a helix on a cylinder containing the sealing edge 4. The helix angle 11 may be approximately 20° thus to define wedge-shaped spaces 12 which operate as pumping elements to pump leakage oil from the atmospheric side 7 back to the oil side 6 due to leakage through such imperfections 8 when the shaft S as viewed from the left-hand side of FIG. 2 rotates in a clockwise direction i.e. upward as viewed in FIGS. 3 to 6.

Initially, when the shaft seal 1 is placed on a shaft S of diameter larger than the diameter of the sealing edge 4 and crests 10 of the pumping ribs 9, the sealing element 3 will be stretched to hug the shaft and, therefore, the sealing edge 4 and crests 10 of the pumping ribs 9 (with initially relatively sharp edges) will slightly widen as represented in FIG. 4, whereby oil leaking through the imperfection 8 will be pumped back to the oil side 6 by the wedge shaped spaces 12 including the flanks 13 of the respective pumping ribs 9.

As the seal 1 wears-in the sealing edge 4 and crests 10 of the pumping ribs 9 will progressively widen as shown in FIG. 5 so that leakage through the imperfection 8 decreases or substantially stops.

When the seal 1 has worn in as shown in FIG. 6 it will have worn away the imperfections 8 and will establish a perfect seal around the shaft S and, at that time, the pumping ribs 9 will have been completely worn away so as not to be operative to pump dirt or dust back into the oil side 6 of the seal in a manner as already described. Thereafter, the width of the sealing edge 4 will continue to increase and to form an effective seal around the shaft S throughout the rest of the life of the seal 1, that is, until the wide sealing band 4 no longer has sufficient pressure contact with the shaft S and the oil film thereon.

In the present invention with an angle 11 of about 20°, the initial length of each pumping rib 9 is about 0.045 inch and the radial depth at the end of each rib is about 0.004 inch. It has been found that usually about five such ribs 9 per circumferential inch of the edge 4 for a 3 inch diameter shaft seal are adequate. The pumping ribs 9 are preferably of triangular cross-section as shown with a vertex angle at the crest 10 of about 90°, whereby said flanks 13 also tend to sweep the oil radially toward the shaft S while also sweeping the oil axially toward the oil side 6.

It has been found that molding imperfections are generally less than 0.004 inch and, therefore, when the sealing edge 4 has been worn to a width (about 0.020 inch) as shown in FIG. 6, the imperfections 8 will have disappeared and at that time the seal 1 yet has a substantial useful life because such initial wearing-in period is just a fractional portion of the entire useful life of the seal 1.

I, therefore, particularly point out and distinctly claim as my invention:

1. A seal for a rotating shaft comprising an elastomeric sealing ring having converging frusto-conical faces defining an annular sealing edge therebetween; one face on one side of said sealing edge having a circumferential series of oblique pumping ribs having helical crests lying on a cylinder of substantially the same diameter as said sealing edge and merging therewith to define wedge shaped pumping spaces operative during rotation of a shaft contacted by said sealing edge and crests to pump oil leaking past said sealing edge from the other side thereof back to said other side; said pumping ribs being in the form of triangular pyramids whose lateral edges merge with said sealing edge, one of the lateral edges of said pyramids constituting said crests.

2. The seal of claim 1 wherein one lateral face of said pyramids constituting a wall of the respective wedge-shape spaces is inclined at an acute angle with respect to the shaft surface to tend to sweep leakage oil radially toward the shaft as well as axially toward such other side.

* * * * *